(12) United States Patent
Marini

(10) Patent No.: US 11,345,259 B2
(45) Date of Patent: May 31, 2022

(54) LONG RAIL ASSEMBLY WITH RETENTION LATCH

(71) Applicant: Magna Seating Inc., Aurora (CA)

(72) Inventor: Detjon Marini, White Lake, MI (US)

(73) Assignee: Magna Seating Inc, Aurora (CA)

( * ) Notice: Subject to any disclaimer, the term of this patent is extended or adjusted under 35 U.S.C. 154(b) by 0 days.

(21) Appl. No.: 17/094,880

(22) Filed: Nov. 11, 2020

(65) Prior Publication Data

US 2021/0138933 A1   May 13, 2021

Related U.S. Application Data

(60) Provisional application No. 62/933,534, filed on Nov. 11, 2019.

(51) Int. Cl.
*B60N 2/07* (2006.01)
*B60N 2/08* (2006.01)

(52) U.S. Cl.
CPC .......... *B60N 2/073* (2013.01); *B60N 2/0715* (2013.01); *B60N 2/0818* (2013.01)

(58) Field of Classification Search
CPC .... B60N 2/0715; B60N 2/0722; B60N 2/073; B60N 2/0812; B60N 2/0818; B60N 2/0837; B60N 2/0843; B60N 2/0862; B60N 2/0875
USPC ............ 248/424, 429, 430; 296/65.13–65.15
See application file for complete search history.

(56) References Cited

U.S. PATENT DOCUMENTS

| 4,262,963 A | * | 4/1981 | Bauer | B60N 2/072 248/429 |
| 4,776,551 A | * | 10/1988 | Nishino | B60N 2/0705 248/429 |
| 4,787,667 A | * | 11/1988 | Nishino | B60N 2/0705 248/430 |
| 4,828,214 A | * | 5/1989 | Kanai | B60N 2/071 248/420 |
| 4,949,931 A | * | 8/1990 | Fujiwara | B60N 2/0292 248/429 |
| 5,046,698 A | * | 9/1991 | Venier | B60N 2/0715 248/430 |
| 5,158,338 A | * | 10/1992 | Hayakawa | B60N 2/01591 297/335 |
| 5,755,422 A | * | 5/1998 | Susko | B60N 2/0705 248/430 |

(Continued)

*Primary Examiner* — Jonathan Liu
*Assistant Examiner* — Guang H Guan
(74) *Attorney, Agent, or Firm* — Miller Canfield

(57) ABSTRACT

A long rail assembly is attached to a floor within an automotive vehicle for transposing vehicle seats between a plurality of positions. The long rail assembly includes a rail drive assembly configured to travel along an interior cavity of a fixed long rail. The fixed long rail has a generally U-shaped cross-section and includes a pair of flanges with mating teeth extending inwardly from a pair of outer walls. The rail drive assembly includes a retention latch and a wheel assembly coupled adjacent a first and a second end of the rail drive assembly. The rail drive assembly is operable between a use position and a loaded position in which at least one of the retention latches engages the mating teeth to interlock the rail drive assembly and the fixed long rail in response to forces causing upward loading on the rail drive assembly.

11 Claims, 8 Drawing Sheets

(56) References Cited

U.S. PATENT DOCUMENTS

| | | | |
|---|---|---|---|
| 6,286,799 B1* | 9/2001 | Fujii | B60N 2/071 248/430 |
| 6,349,914 B1* | 2/2002 | Yoshida | B60N 2/071 248/424 |
| 6,691,971 B2* | 2/2004 | Yamada | B60N 2/0705 248/430 |
| 7,331,558 B2 | 2/2008 | Jeong | |
| 8,844,891 B2 | 9/2014 | Yamada et al. | |
| 9,126,505 B2* | 9/2015 | Moriyama | B60N 2/0705 |
| 9,919,624 B2* | 3/2018 | Cziomer | B60N 2/07 |
| 10,011,195 B2 | 7/2018 | Kume et al. | |
| 10,220,731 B2* | 3/2019 | Kume | B60N 2/0715 |
| 10,414,300 B2* | 9/2019 | Sato | B60N 2/0705 |
| 2021/0138933 A1* | 5/2021 | Marini | B60N 2/0715 |
| 2021/0370804 A1* | 12/2021 | Zhao | B60N 2/0715 |

* cited by examiner

LONG RAIL ASSEMBLY WITH RETENTION LATCH

CROSS-REFERENCE TO RELATED APPLICATIONS

This application claims priority to and all the benefits of U.S. Provisional Application No. 62/933,534, filed on Nov. 11, 2019, which is hereby incorporated by reference in its entirety.

BACKGROUND OF THE INVENTION

1. Field of the Invention

The present invention relates to a long rail assembly for transposing a seat within an automotive vehicle.

2. Description of Related Art

Rail assemblies for transposing seats within an automotive vehicle are known in the art. Typical rail assemblies include a fixed track having an elongated frame with a generally U-shaped cross-section defining an interior cavity therein. The fixed track includes a lower portion extending laterally between a pair of upwardly-extending side walls and an end portion extending laterally inward from each side wall. The rail assembly further includes a moveable drive assembly repositionable longitudinally along the interior cavity of the fixed track. The moveable drive assembly has an elongated body extending between a first end and an opposite second end with wheels coupled adjacent the first and second ends thereof. However, typical rail assemblies known in the art can be susceptible to deformation during upward loading on the moveable drive assembly, including vertical or lateral separation of the end portions extending laterally inward from the side walls of the fixed track. Such deformation can potentially result in partial or complete separation of the moveable drive assembly from within the interior cavity of the fixed track.

SUMMARY OF THE INVENTION

According to one aspect of the invention, a long rail assembly is provided for transposing a seat within an automotive vehicle. The long rail assembly includes a fixed long rail having an elongated frame with a generally U-shaped cross-section defining an interior cavity therein. The fixed long rail includes a lower portion extending laterally between a pair of upwardly-extending side walls and an end portion extending laterally inward from each side wall and terminating at a downwardly-extending flange. A plurality of mating teeth extend from each downwardly-extending flange. The long rail assembly further includes a rail drive assembly repositionable longitudinally along the interior cavity of the fixed long rail. The rail drive assembly has an elongated body extending between a first and an opposite second end and a retention latch coupled adjacent to at least one of the first and the second ends thereof. The rail drive assembly is operable between a loaded position in which the at least one retention latch is engaged with the mating teeth of each flange for inhibiting lateral separation of the flanges, and a use position in which the retention latch is disengaged from the mating teeth of each flange for allowing movement of the rail drive assembly along the interior cavity of the fixed long rail.

BRIEF DESCRIPTION OF THE DRAWINGS

Advantages of the present disclosure will be readily appreciated as the same becomes better understood by reference to the following detailed description when considered in connection with the accompanying drawings, wherein.

DETAILED DESCRIPTION OF THE EMBODIMENTS

Figure 2:
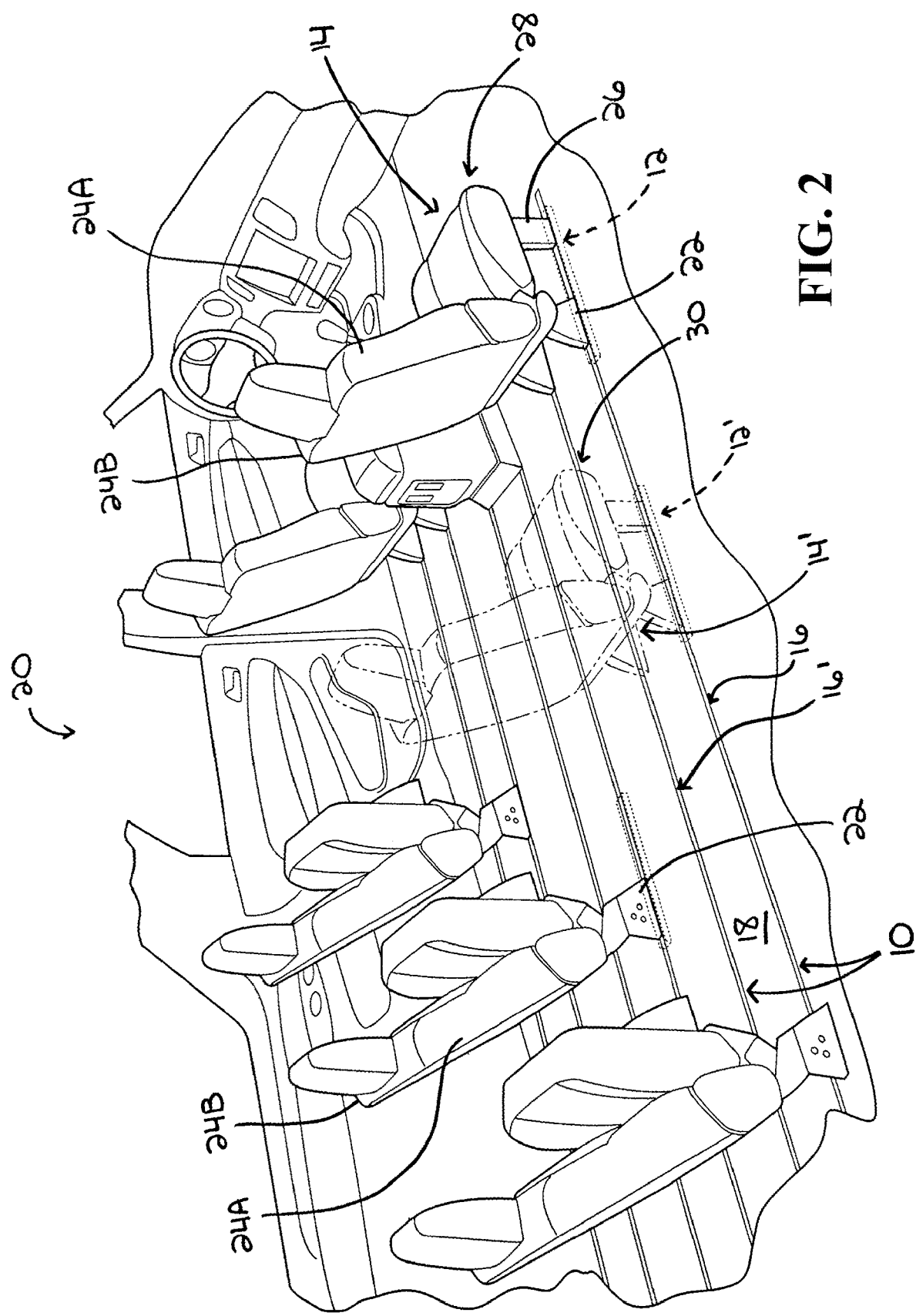
FIG. 2 is a fragmentary perspective view of a vehicle interior with a plurality of seats coupled to the long rail assembly of FIG. 1.

Referring to the Figures, wherein like numerals indicate like or corresponding parts throughout the several views, a long rail assembly for transposing a seat within an automotive vehicle is shown generally at 10. The long rail assembly 10 includes a rail drive assembly 12 for adjusting a position of the seat 14 along a fixed long rail 16. Referring to FIG. 2, the fixed long rails 16 extend longitudinally along and are affixed to a vehicle floor 18 in a vehicle interior 20. Each rail drive assembly 12 travels along one of the fixed long rails 16, and each seat 14 is coupled to the rail drive assembly 12 by at least a first leg 22 on opposing sides 24A, 24B of the seat 14. Optionally, the seats 14 may be coupled to the rail drive assembly 12 by the first leg 22 and a second leg 26 on each of the opposing sides 24A, 24B of the seat 14. The legs 22, 26 may be coupled to the rail drive assembly 12 by any method known in the art, such as studs, bolts, or a striker and latch mechanism. Each seat 14 therefore travels along a pair of fixed long rails 16, 16' for repositioning the seat 14 within the automotive vehicle, such as between a first seat location 28 and a second seat location 30, shown in FIG. 2 in phantom as seat 14' attached to rail drive assembly 12'. The fixed long rails 16 can extend along the vehicle floor 18 of the vehicle interior 20 for any length suitable for an intended application. Likewise, any suitable number of fixed long rails 16 can be positioned on the vehicle floor 18 as desired for an intended application.

Figure 3:
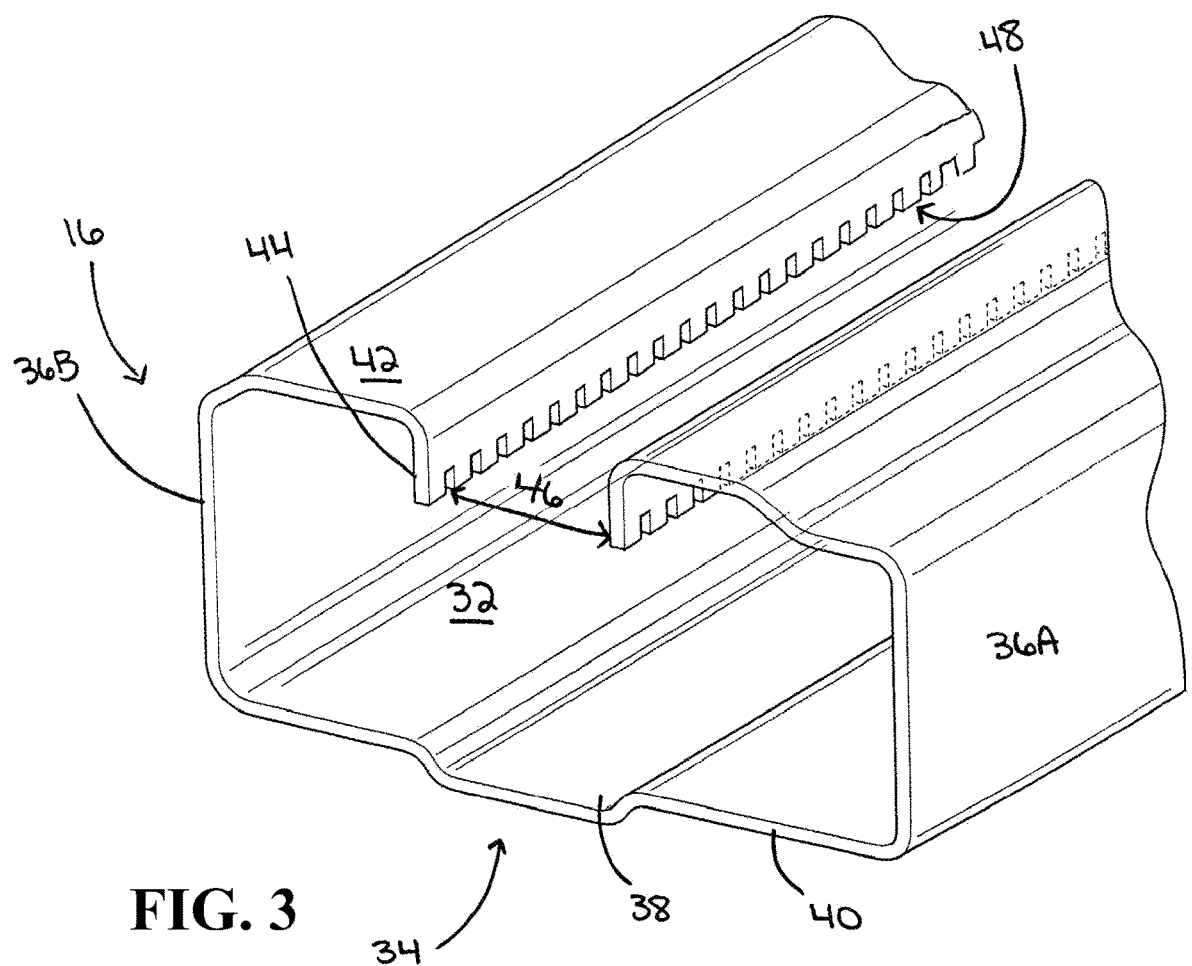
FIG. 3 is a fragmentary perspective view of the fixed long rail of the long rail assembly of FIG. 1 showing a generally U-shaped cross-section and a plurality of mating teeth.

Referring to FIG. 3, the fixed long rail 16 has a generally U-shaped cross-sectional profile extending longitudinally along the vehicle floor 18 and defining an interior cavity 32 therethrough. The generally U-shaped cross-sectional profile of the fixed long rail 16 includes a lower portion 34 extending between a pair of upwardly-extending side walls 36A, 36B. A channel 38 longitudinally bisects the lower portion 34 of the fixed long rail 16 to define a pair of running surfaces 40 on the lower portion 34 of the fixed long rail 16 extending from the channel 38 to each side wall 36A, 36B. An end portion 42 of the fixed long rail 16 extends laterally inwardly from each side wall 36A, 36B and terminates at a downwardly-extending flange 44, and a lateral gap 46 is defined between the flanges 44. A plurality of mating teeth 48 extend downwardly from each flange 44 along the fixed long rail 16. The fixed long rail 16 is a stamped, formed, molded, or rolled section of a metal or plastic material with a length selected based on a specific application. It should therefore be appreciated that the overall size and shape of the fixed long rail 16, including the end portions 42 and the flanges 44, may vary without altering the scope of the invention.

Figure 1:
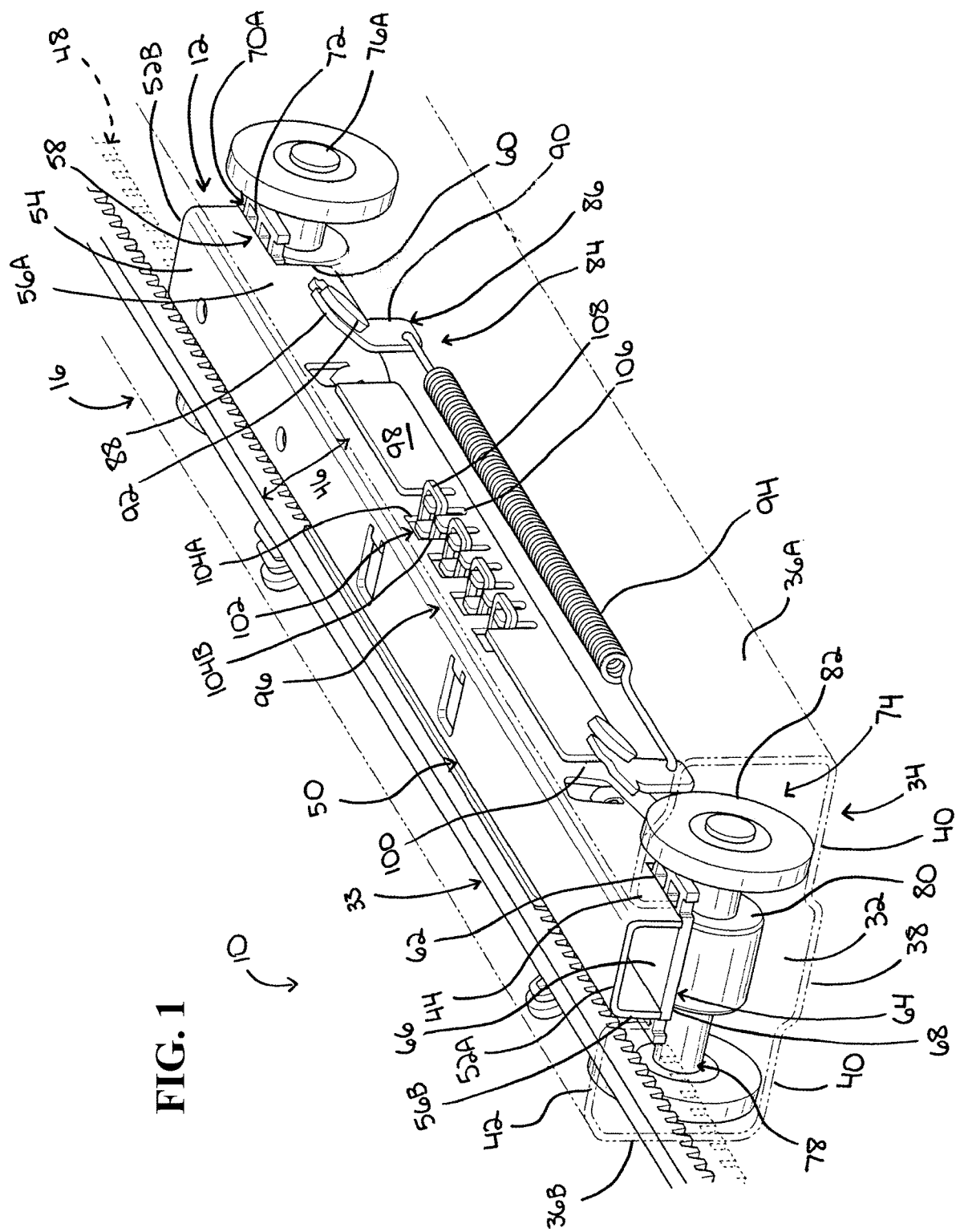
FIG. 1 is a fragmentary perspective view of a long rail assembly showing a rail drive assembly and a portion of a fixed long rail according to a primary embodiment of the present invention.
Figure 4:
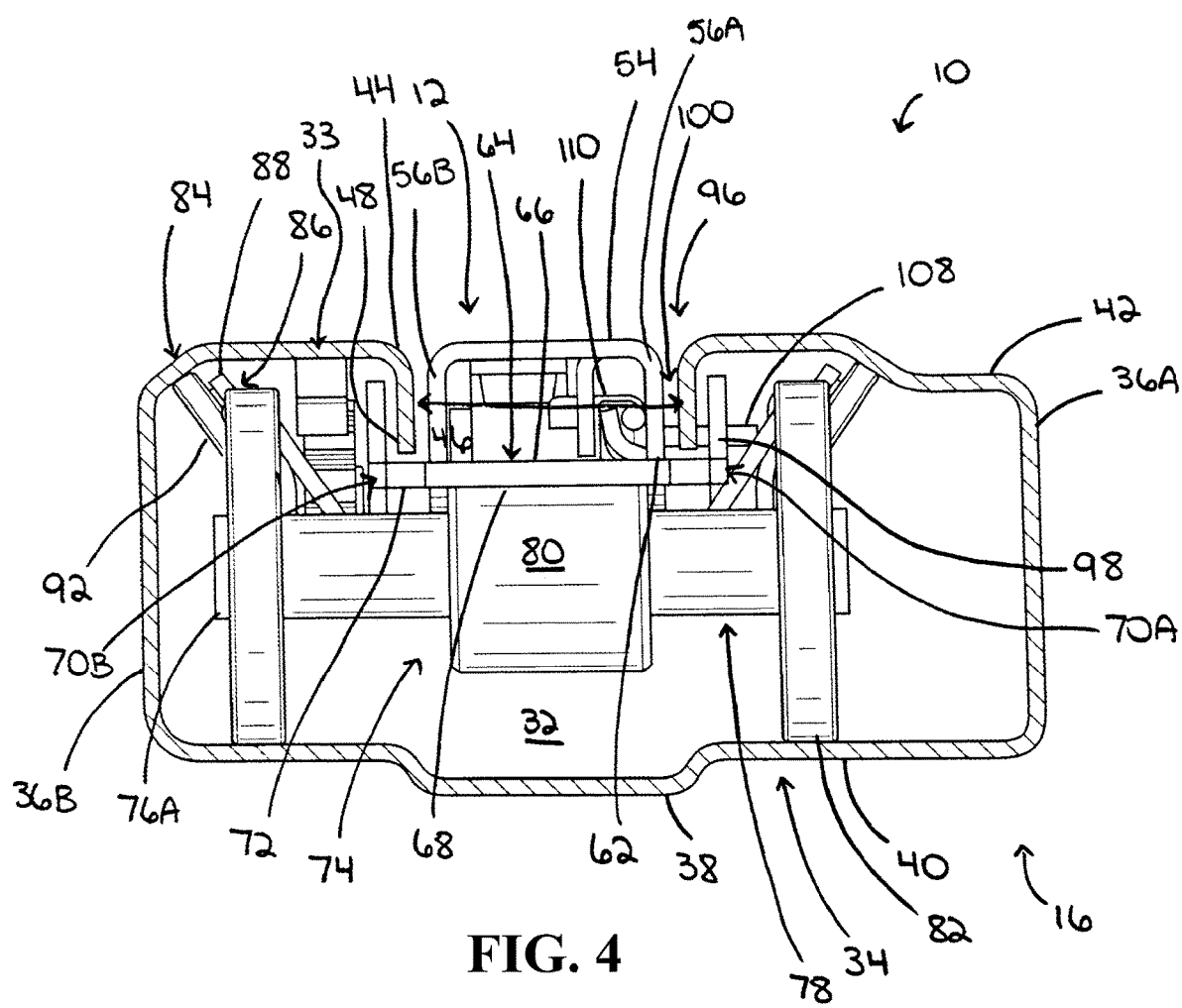
FIG. 4 is a cross-sectional end view of the long rail assembly of FIG. 1.

Referring to FIGS. 1 and 4, the rail drive assembly 12 is disposed generally within the interior cavity 32 of the fixed long rail 16. A power driving system known in the art, shown generally at 33, may be operatively coupled between the rail drive assembly 12 and the fixed long rail 16 for powered repositioning of the rail drive assembly 12 along the interior cavity 32 of the fixed long rail 16. One such power driving system is described in International Publication No. WO/2020/186259, the disclosure of which is hereby incorporated by reference in its entirety. However, it should be appreciated that the long rail assembly 10 may utilize any suitable power driving system, or omit the power driving system entirely, without varying the scope of the invention.

Figure 7:
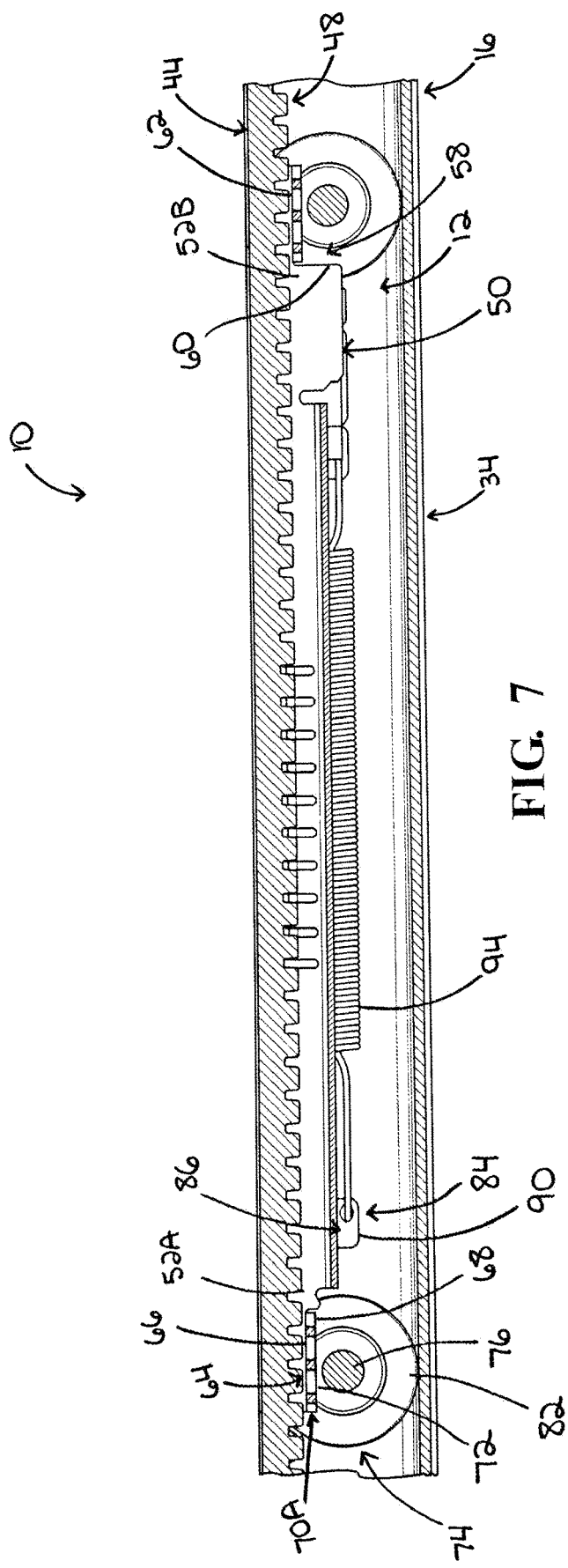
FIG. 7 is a fragmentary cross-sectional side view of a portion of the long rail assembly of FIG. 1 further showing the rail drive assembly in the use position.

The rail drive assembly 12 includes an elongated body 50 having an inverted, generally U-shaped cross-sectional profile extending longitudinally between a first end 52A and an opposite second end 52B, as shown in FIGS. 1 and 4. The inverted U-shaped cross-sectional profile of the elongated body 50 includes a top portion 54 extending between a pair of opposing side walls 56A, 56B, wherein at least the top portion 54 is disposed generally within the lateral gap 46 between the flanges 44. The side walls 56A, 56B adjacent each end 52A, 52B of the elongated body 50 include a cutout portion 58 having a vertical side 60 and a horizontal side 62 intersecting at a substantially right angle, as shown in FIGS. 1 and 7. A retention latch 64 is coupled adjacent to at least one of the first and second ends 52A, 52B of the elongated body 50 of the rail drive assembly 12. The embodiment of the rail drive assembly 12 shown in the Figures includes the retention latch 64 coupled adjacent to both the first and second ends 52A, 52B of the elongated body 50. However, it is to be appreciated that the rail drive assembly 12 may alternatively include the retention latch 64 coupled adjacent to only the first end 52A or only the second end 52B of the elongated body 50 without varying the scope of the invention.

Figure 5:
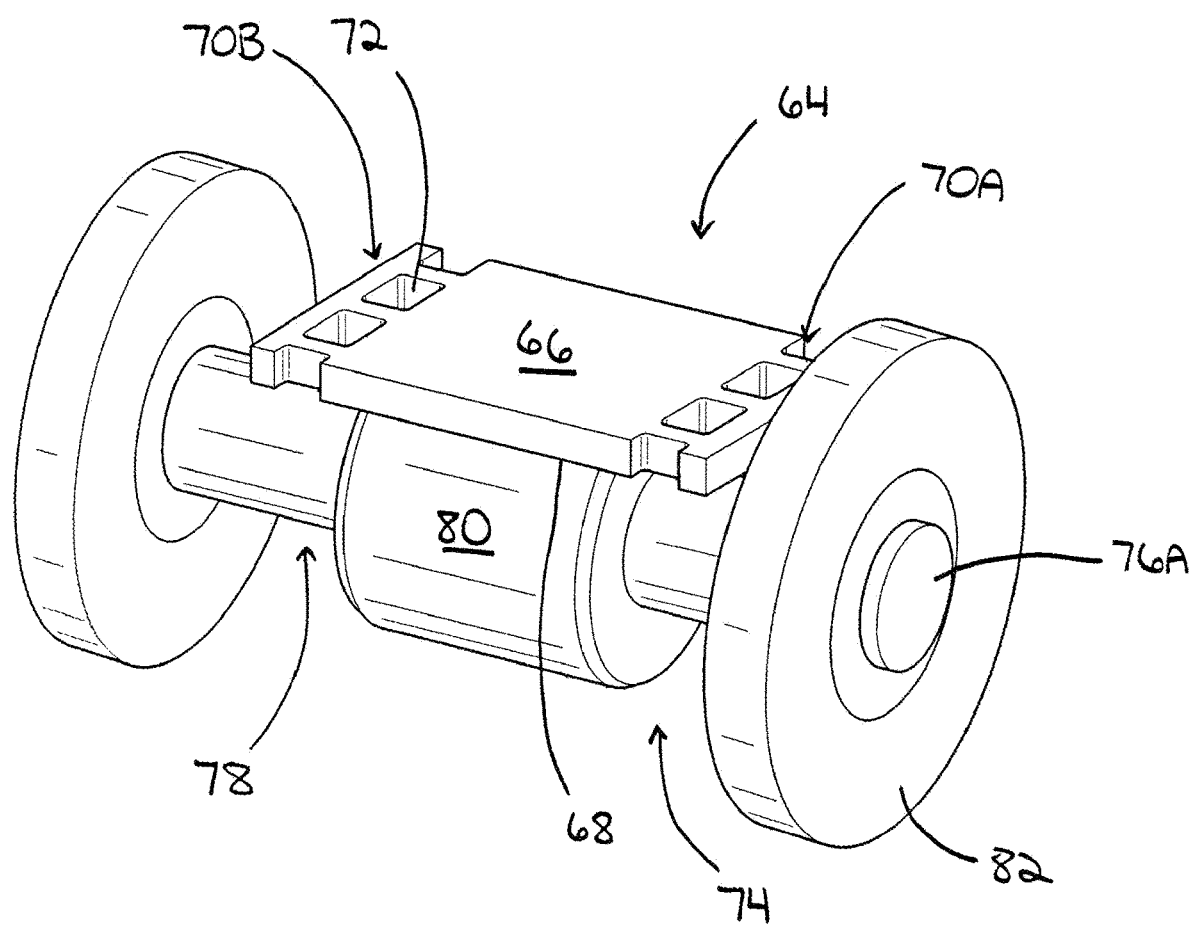
FIG. 5 is an enlarged perspective view of a retention latch and a wheel assembly of the long rail assembly of FIG. 1.

Referring to FIG. 5, each retention latch 64 has a substantially planar body with an upward-facing side 66 and a downward-facing side 68 extending laterally between a pair of lateral side portions 70A, 70B. A plurality of slots 72 are disposed along each of the lateral side portions 70A, 70B of the retention latches 64 for selective mating engagement with the mating teeth 48 on each respective flange 44. The upward-facing side 66 of each retention latch 64 is secured to the horizontal side 62 of the respective cutout portion 58 on the elongated body 50, as shown in FIGS. 1 and 4. The lateral side portions 70A, 70B of each retention latch 64 extend past the respective side walls 56A, 56B of the elongated body 50 such that the slots 72 are vertically aligned under the mating teeth 48 of the flanges 44, as shown in FIG. 4. The retention latches 64 may alternatively take any number of other suitable shapes or designs for selective mating engagement with the mating teeth 48 on the flanges 44, or may be attached to the rail drive assembly 12 in any suitable manner, without varying the scope of the invention.

Figure 6A:
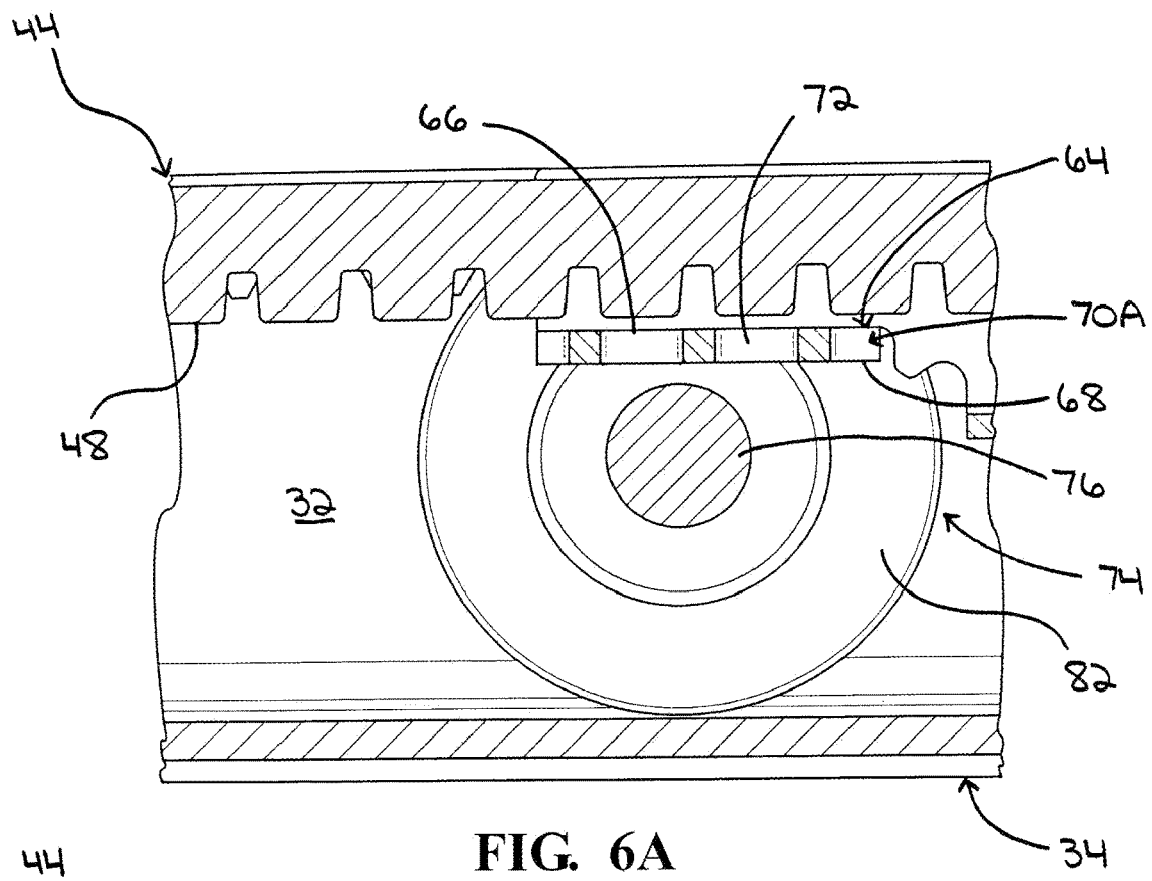
FIG. 6A is an enlarged fragmentary cross-sectional side view of the long rail assembly of FIG. 1 showing the retention latch and the rail drive assembly in a use position.
Figure 6B:
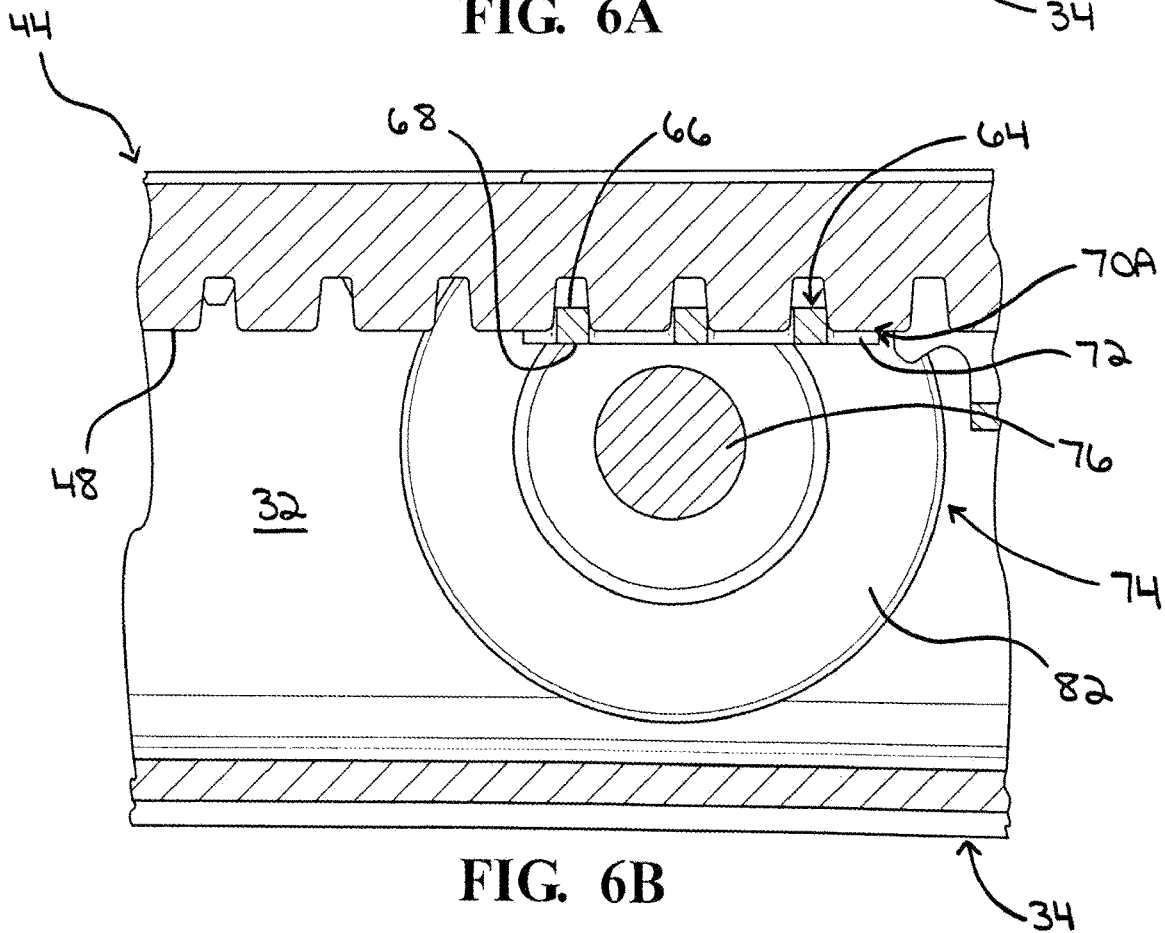
FIG. 6B is an enlarged fragmentary cross-sectional side view of the long rail assembly of FIG. 1 showing the retention latch and the rail drive assembly in a loaded position.

Referring to FIGS. 6A and 6B, the rail drive assembly 12 is operable between a use position and a loaded position in response to forces causing upward loading on the rail drive assembly 12, such as those present during an automotive vehicle accident. In the use position, shown in FIGS. 1, 4, 6A, and 7, the slots 72 in the retention latches 64 are disengaged from and spaced vertically under the mating teeth 48 on each respective flange 44 for allowing unobstructed movement of the rail drive assembly 12 along the interior cavity 32 of the fixed long rail 16. In the loaded position, shown in FIGS. 6B and 8, the slots 72 in at least one of the retention latches 64 are matingly engaged with the mating teeth 48 on each respective flange 44 to interlock the rail drive assembly 12 and the fixed long rail 16. Interlocking the rail drive assembly 12 and the fixed long rail 16 in response to upward loading on the rail drive assembly 12 provides additional surface area for distributing the upward load. Furthermore, interlocking the rail drive assembly 12 and the fixed long rail 16 inhibits lateral separation and upward peeling of the flanges 44 due to the upward load, therefore helping to maintain structural integrity of the long rail assembly 10 and retain the rail drive assembly 12 within the interior cavity 32 of the fixed long rail 16.

Figure 8:
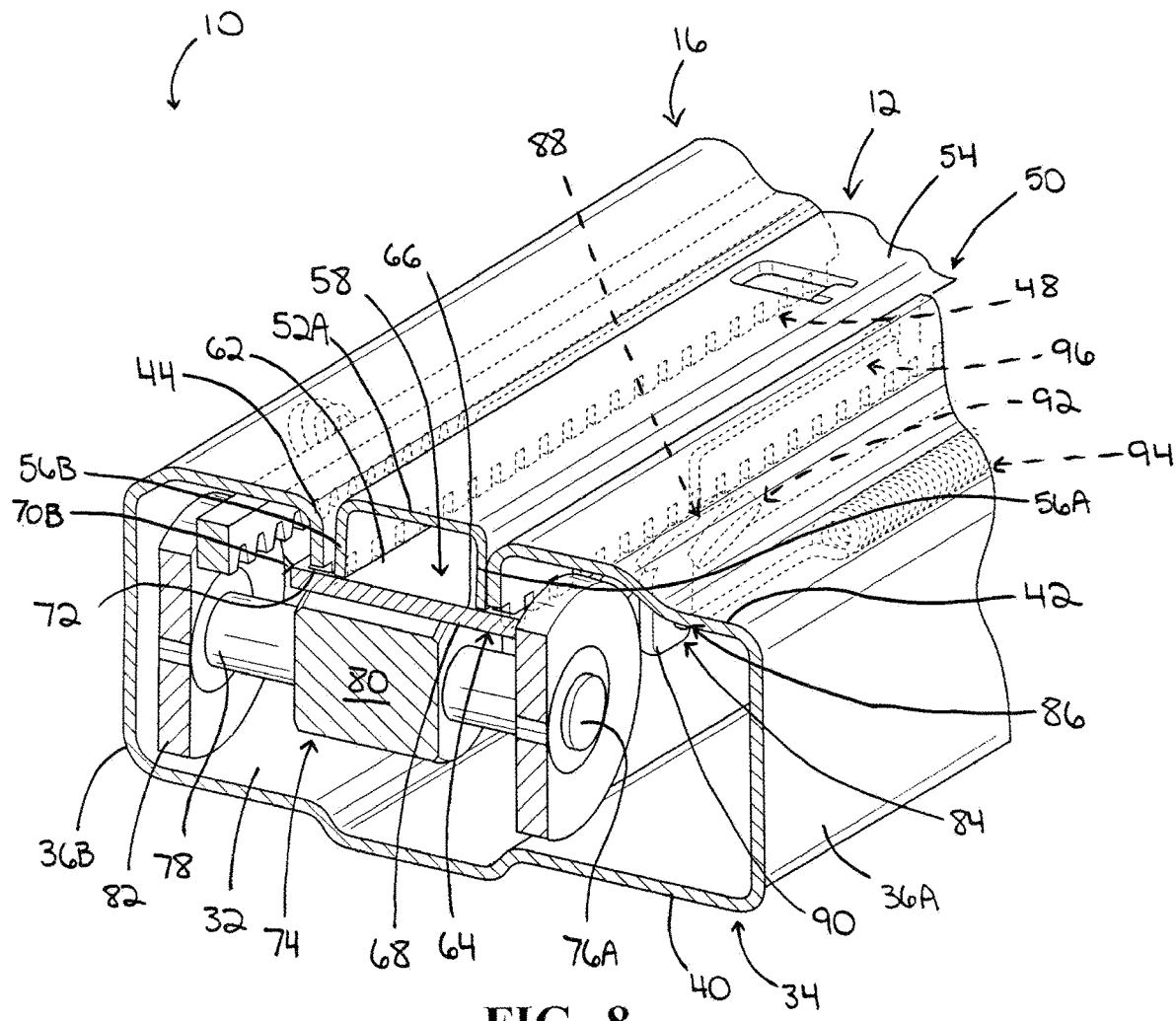
FIG. 8 is a fragmentary cross-sectional perspective view of the long rail assembly of FIG. 1 further showing the rail drive assembly in the loaded position.

A wheel assembly 74 is further coupled to the rail drive assembly 12 for easily repositioning the rail drive assembly 12 longitudinally along the interior cavity 32 of the fixed long rail 16. The embodiment of the rail drive assembly 12 shown in the Figures includes the wheel assembly 74 coupled to the downward-facing sides 68 of each retention latch 64. However, it is to be appreciated that the wheel assembly 74 may alternatively be coupled directly to the elongated body 50 of the rail drive assembly 12 or to any other suitable structure on the rail drive assembly 12 without varying the scope of the invention. Referring to FIGS. 5 and 8, each wheel assembly 74 includes an axle 76 extending laterally through a hollow tube 78 having a substantially cylindrical center portion 80. The center portion 80 of the hollow tube 78 is fixedly coupled to the downward-facing side 68 of the retention latch 64, and a wheel 82 is fixedly attached to each end 76A of the axle 76 for engaging the running surfaces 40 of the fixed long rail 16. Alternatively, the wheel assembly 74 may substitute the wheels 82 for rollers or glides, or may instead have a shaft fixedly coupled to the retention latch 64 with a pair of wheels rotatably coupled to the shaft. It should also be appreciated that the rail drive assembly 12 may include any number or combination of rollers, glides, and wheels as suitable for an intended application without varying the scope of the invention.

A pair of stability rolling elements 84, shown in FIGS. 1, 4, and 8, are rotationally coupled to each side wall 56A, 56B of the elongated body 50 for vertically and horizontally stabilizing the rail drive assembly 12 within the interior cavity 32 of the fixed long rail 16. Each stability rolling element 84 includes a roller arm 86 extending between an upper portion 88 and an opposite lower portion 90. A roller 92 is rotationally coupled to the upper portion 88 of each roller arm 86, and a stability spring 94 extends between the lower portions 90 of each pair of stability rolling elements 84 to bias the stability rolling elements 84 against the respective end portions 42 of the fixed long rail 16. As shown in the Figures, the stability rolling elements 84 extend outwardly at an angle relative to the respective side walls 36A, 36B of the fixed long rail 16 to counteract both vertical and lateral tolerance variations of the long rail assembly 10. However, it is to be appreciated that the stability rolling elements 84 may be oriented at any suitable angle relative to the side walls 36A, 36B of the fixed long rail 16 without varying the scope of the invention.

Referring to FIG. 1, the long rail assembly 10 further includes a loop latch assembly 96 integrated with the rail drive assembly 12 for selectively locking the rail drive assembly 12 with the fixed long rail 16, thereby retaining the seat 14 at a desired position within the automotive vehicle. A portion of at least one of the side walls 56A, 56B of the elongated body 50 is bent upwardly to form an outer channel wall 98 laterally spaced from the respective side wall 56A, 56B and defining a generally U-shaped channel 100 therebetween. The channel 100 is positioned such that the respective flange 44 of the fixed long rail 16 is disposed between the respective side wall 56A, 56B of the rail drive assembly 12 and the outer channel wall 98, as shown in FIG. 4. Referring to FIG. 1, a plurality of inverted, generally U-shaped notches or slots 102 with opposing sides 104A, 104B are spaced apart longitudinally on the side wall 56A, 56B of the rail drive assembly 12, and a plurality of corresponding generally vertical notches or slots 106 are spaced apart longitudinally on the outer channel wall 98. Each vertical slot 106 in the outer channel wall 98 is aligned with one of the opposite sides 104A, 104B of the inverted U-shaped slots 102 in the side wall 56A, 56B, as shown in FIG. 1.

The loop latch assembly 96 further includes a plurality of generally U-shaped loops 108 operable between an engaged and a disengaged position by any suitable means known in the art. Referring to FIG. 4, a latch retainer 110 is mounted between the side walls 56A, 56B of the elongated body 50. The loops 108 extend from the latch retainer 110 through the inverted U-shaped slots 102 in the side wall 56A, 56B and the vertical slots 106 in the outer channel wall 98. In the engaged position, shown in FIGS. 1 and 4, the loops 108 are engaged with the mating teeth 48 on the flange 44 for preventing movement between the rail drive assembly 12 and the fixed long rail 16, thereby retaining the seat 14 at the desired position within the automotive vehicle. In the disengaged position, the loops 108 pivot downward at the latch retainer 110 to disengage the mating teeth 48 on the flange 44 for allowing unobstructed movement of the rail drive assembly 12 along the interior cavity 32 of the fixed long rail 16. While a loop latch assembly 96 is shown in the Figures, it should be appreciated that alternative latching mechanisms can be substituted for the loop latch assembly 96 without altering the scope of the invention.

Further details and additional alternative embodiments of the long rail assembly 10 are described in International Publication Nos. WO/2020/077209 and WO/2020/131777, the disclosures of which are hereby incorporated by reference in their entirety.

Referring to operation of the primary embodiment of the long rail assembly 10, the rail drive assembly 12 is disposed in the use position for general, everyday operation of the seat 14 within the automotive vehicle. In the use position, shown in FIGS. 1 and 4, the slots 72 in the retention latches 64 are disengaged from and spaced vertically under the mating teeth 48 on each respective flange 44 for allowing unobstructed movement of the rail drive assembly 12 along the interior cavity 32 of the fixed long rail 16, aided by the wheels 82 and stability rolling elements 84. Therefore, the seat 14 may be repositioned longitudinally as desired across the vehicle floor 18, and the seat 14 may be locked at a desired position using, for example, the loop latch assembly 96.

In the event of a force causing upward loading on the rail drive assembly 12, such as during an automotive vehicle accident, the rail drive assembly 12 pivots or deforms within the interior cavity 32, generally at the stability rolling elements 84, the wheel assembly 74, or the loop latch assembly 96, thereby raising at least one of the first and second ends 52A, 52B of the elongated body 50 and correspondingly raising at least one of the retention latches 64. As the at least one retention latch 64 is raised within the interior cavity 32 of the fixed long rail 16, the slots 72 in the at least one retention latch 64 engage the mating teeth 48 on each of the flanges 44 to interlock the rail drive assembly 12 and the fixed long rail 16, as shown in FIG. 8, therefore providing additional surface area for distributing the upward load and inhibiting lateral and vertical separation of the flanges 44. After the event causing upward loading on the rail drive assembly 12 has passed, the rail drive assembly 12 may pivot in an opposite direction to lower the at least one end 52A, 52B of the elongated body 50 and the at least one retention latch 64, therefore causing the retention latch 64 to disengage the mating teeth 48 and returning the rail drive assembly 12 to the use position. The slots in the retention latches 64 are then again spaced vertically under the mating teeth 48 on each respective flange 44 for allowing unobstructed movement of the rail drive assembly 12 along the interior cavity 32 of the fixed long rail 16. However, if deformation occurs during the event causing upward loading on the rail drive assembly 12, it should be appreciated that the deformation may prevent the rail drive assembly 12 from pivoting in the opposite direction, thereby preventing the retention latch 64 from disengaging the mating teeth 48.

The invention has been described in an illustrative manner, and it is to be understood that the terminology which has been used is intended to be in the nature of words of description rather than of limitation. Directional references employed or shown in the description, figures or claims, such as top, bottom, upper, lower, upward, downward, lengthwise, widthwise, longitudinal, lateral, and the like, are relative terms employed for ease of description and are not intended to limit the scope of the invention in any respect. Many modifications and variations of the present invention are possible in light of the above teachings. It is, therefore, to be understood that within the scope of the appended claims, the invention may be practiced other than as specifically described.

What is claimed is:

1. A long rail assembly for transposing a seat within an automotive vehicle, the long rail assembly comprising:
 a fixed long rail having an elongated frame with a generally U-shaped cross-section defining an interior cavity therein, the fixed long rail including a pair of upwardly-extending side walls, a lower portion extending laterally between the side walls, a pair of end portions each extending from a respective one of the side walls, and a pair of downwardly-extending flanges, each of the end portions terminating at a respective one of the flanges;
 a first plurality of mating teeth extending from one of the flanges, and a second plurality of mating teeth extending from the other of the flanges; and
 a rail drive assembly repositionable longitudinally along the interior cavity of the fixed long rail, the rail drive assembly including an elongated body extending between a first end and an opposite second end, a first retention latch coupled adjacent to the first end of the elongated body, and a second retention latch coupled adjacent to the second end of the elongated body, each of the first and second retention latches including a plurality of slots arranged under the first and second pluralities of mating teeth for selective mating engagement therewith, the plurality of slots of each of the first and second retention latches vertically aligned with respective ones of the first plurality of mating teeth and respective ones of the second plurality of mating teeth, wherein the rail drive assembly is operable between a loaded position in which at least one of the first and second retention latches is engaged with the first and second pluralities of mating teeth for inhibiting lateral separation of the flanges and interlocking the rail drive assembly and the fixed long rail, and a use position in which the first and second retention latches are disengaged from the first and second pluralities of mating teeth for allowing movement of the rail drive assembly along the interior cavity of the fixed long rail, and wherein the elongated body is adapted to pivot within the interior cavity in response to upward loading on the rail drive assembly for raising at least one of the first and second ends thereof to cause the rail drive assembly to move from the use position to the loaded position.

2. The long rail assembly of claim 1 wherein each of the first and second retention latches has a pair of side portions and a substantially planar body extending between the side portions, wherein the plurality of slots of each of the first and second retention latches include a first set of slots defined by one of the side portions and a second set of slots defined by the other of the side portions, the first set of slots of the plurality of slots of each of the first and second retention latches arranged for mating engagement with the first plurality of mating teeth and the second set of slots of the plurality of slots of each of the first and second retention latches arranged for mating engagement with the second plurality of mating teeth to operatively lock the rail drive assembly in the loaded position.

3. The long rail assembly of claim 2 wherein the elongated body of the rail drive assembly has an inverted, generally U-shaped cross-section including a pair of opposing side walls and an upper portion extending laterally between the opposing side walls.

4. The long rail assembly of claim 3 wherein each of the opposing side walls defines a first cutout portion adjacent to the first end of the elongated body and a second cutout portion adjacent to the second end of the elongated body, each of the first and second cutout portions of each of the opposing side walls having a horizontal cutout side and a vertical cutout side intersecting the horizontal cutout side.

5. The long rail assembly of claim 4 wherein the first retention latch is secured to the horizontal cutout sides of the first cutout portions of the opposing side walls, and the second retention latch is secured to the horizontal cutout sides of the second cutout portions of the opposing side walls.

6. The long rail assembly of claim 5 further comprising first and second wheel assemblies for repositioning the rail drive assembly longitudinally along the interior cavity of the fixed long rail, the first wheel assembly coupled to the elongated body adjacent to the first end thereof, and the second wheel assembly coupled to the elongated body adjacent to the second end thereof.

7. The long rail assembly of claim 6 wherein the first wheel assembly is coupled to the first retention latch and the second wheel assembly is coupled to the second retention latch.

8. The long rail assembly of claim 7 wherein each of the first and second wheel assemblies includes a hollow tube fixedly attached to a respective one of the first and second retention latches, an axle positioned within the hollow tube and extending between a first end and a second end, and a plurality of wheels each fixedly attached to a respective one of the first and second ends of the axle.

9. The long rail assembly of claim 7 wherein the first and second wheel assemblies each include a shaft fixedly coupled to a respective one of the first and second retention latches with a pair of wheels rotatably coupled to the shaft.

10. The long rail assembly of claim 8 further comprising a loop latch assembly integrated with the rail drive assembly for selectively locking the rail drive assembly with the fixed long rail, thereby retaining the rail drive assembly at a desired position along the fixed long rail.

11. The long rail assembly of claim 10 further comprising a pair of stability rolling elements operatively coupled to at least one of the opposing side walls of the elongated body for vertically and horizontally stabilizing the rail drive assembly within the interior cavity of the fixed long rail.

* * * * *